Patented Mar. 22, 1938

2,112,129

UNITED STATES PATENT OFFICE 2,112,129

METHOD OF PREPARING ORGANIC MERCURY COMPOUNDS

Carl N. Andersen, Wellesley Hills, Mass., assignor to Lever Brothers Company, a corporation of Maine No Drawing. Application November 15, 1935, Serial No. 50,001

17 Claims. (Cl. 260—13)

The present invention relates to a method of preparing organic mercury compounds and more particularly to a method of preparing compounds of the general formula $(RHg)_x.R_1$, in which R represents an aromatic structure, to a carbon atom of which the mercury is attached; in which $x$ is an integer having a value of one or more; and in which $R_1$ represents a radical corresponding to an acid or an acid derivative.

More particularly, R represents an aromatic structure, which may be an aromatic nucleus with or without side chains, and the expression "aromatic structure" used herein, is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nuclear similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, naphthyl, xylyl and tolyl groups.

In my applications, Serial Nos. 694,198, 694,199, and 694,206, filed October 18, 1933 and Serial No. 17,271, filed April 19, 1935, I have shown that an aromatic mercury compound such as the hydroxide or a soluble salt, for example, the acetate, or lactate, may be reacted with various organic and inorganic acids to produce salts in which the aromatic mercury radical is linked to the acidic radical through the replacement of one or more of the acidic hydrogen atoms. The organic acids include the carboxylic, sulfonic and arsenic acids.

I have now discovered that an acid derivative may be reacted with an organic mercury compound to yield an organic mercury derivative. Examples of the acid derivatives I may employ include the esters, lactones, acid halides, and acid anhydrides. The acid derivatives may be either of aliphatic or cyclic structure, and may be derivatives of various types of acids, for example, carboxylic, sulfonic or inorganic acids.

The employment of the acid derivatives has a number of advantages. In many cases the acid derivatives, for example, ethyl aceto acetate, are more soluble than the corresponding free acids. In many other cases they are easier to obtain and less expensive. In other instances, for example, ethyl malonate, the reaction proceeds more rapidly, and in other cases, for example, ethyl cinnamate, the reaction proceeds more slowly. There may be conditions of production under which the control of the speed of the reaction by the employment of the acid derivative is very desirable. In still other instances, the acid derivative is more soluble than a free acid and is therefore easier to subject to the reaction.

The method which is the subject of this invention consists generally in reacting together the acid derivative and the organic mercury compound in any common solvent in the presence of water. If both the reacting components are water soluble, water is employed for reasons of convenience. If this is not the case, other solvents in which the reacting components are soluble, such as one of the alcohols, acetone or mixtures of these may be used, but in every case the reaction is facilitated if some water is present.

If the compound formed is relatively insoluble it may be removed immediately by filtration, washed and dried. If the compound is moderately soluble, the solution may be concentrated during which time it will crystallize out and may then be separated by filtration and purified.

Various organic mercury compounds may be employed in the process, although I find the hydroxide to be particularly desirable for the reason that water is one of the products of the reaction and the separation and purification of the resulting organic mercury derivative is therefore facilitated. If the organic mercury derivative is relatively insoluble as compared with the other components of the reaction, it will be precipitated and tend to carry the reaction to completion.

Other organic mercury compounds I find desirable are the salts, such as the acetate or lactate. When the salts are used, the corresponding acid, in such cases acetic acid and lactic acid, is also formed. The process using the salt may be employed when the organic mercury derivative to be produced is relatively insoluble as compared with the salt and the acid derivative.

As a general rule it is desirable to employ approximately theoretical quantities of the reacting materials, although in some cases about 10% excess of the acid derivative may be employed in order to insure the complete conversion of the organic mercury compound.

The process may be carried out at any temperature; in some cases heat may be employed in order to assist in the solution of the reacting components and speed the reaction. When the reaction is slow, heat is particularly desirable.

The results of my process may be explained by more than one chemical reaction. The following explanations are given in order to assist in the understanding of my invention, but I do not wish to be understood as limiting my process to these explanations.

When the process is carried out using an anhydride, it is probable that two molecules of acid are formed by the reaction of the anhydride with water. The acid thus formed then reacts with the organic mercury compound to form a salt in accordance with the process set forth in my applications hereinbefore mentioned. When lactones are employed it is probable that the lactone reacts with water to produce the corresponding acid which reacts with the organic mercury compound.

When an acid halide is employed, an organic mercury halide is formed in addition to the organic mercury salt corresponding to the principal acid. This would indicate that the acid halide is hydrolyzed to form the acid and a hydrogen halide, each of which reacts with the organic mercury compound. The two salts so produced must be separated subsequent to the reaction. This is facilitated due to the fact that the organic mercury halides are generally more insoluble than the salts of other acids.

When an ester is reacted with an organic mercury hydroxide there is formed, besides the organic mercury derivative and water, the corresponding alcohol. The alcohol does not enter into the reaction and as it is a liquid the organic mercury salt is readily separated therefrom and purified. I am not prepared to say definitely what the reactions are that are involved and, therefore, do not intend to be bound by any theory advanced. However, it would appear that either the ester is hydrolyzed to form the corresponding acid and alcohol, and the acid reacts with the organic mercury compound, or that the reaction is one of double decomposition reaction between the ester and the organic mercury compound in which water does not enter.

When other of the acid derivatives, for example, the anhydride, or lactone, are reacted with the organic mercury hydroxide it is also possible that the reaction takes place without water entering into it. However, having disclosed the objective elements of my process, as required by the patent law, I prefer not to commit myself to any speculation or to any one explanation of the reactions involved.

In most instances the esters will yield simple salts. In certain instances, however, basic salts or double salts may be formed depending upon the ester and the conditions under which the reaction takes place. For example, the benzoate esters, such as methyl benzoate, and iso-butyl benzoate, under normal conditions react with an organic mercury hydroxide to form basic salts. The simple organic mercury benzoate, no doubt, is an intermediate product of the reaction and reacts with another molecule of the hydroxide to form the basic salt before the intermediate product can be isolated.

In the case of certain esters which contain reactive side groups or chains, the organic mercury compound may react with the side group or chain in addition to its reaction with the acidic group, thus forming a double salt. For example, if methyl salicylate, which contains an OH group, is reacted with an organic mercury hydroxide, it appears that the hydroxide will react with the OH group as well as with the carboxylic group. If the compounds are formed as a result of the hydrolysis of the ester it appears that these double salts are formed due to the fact that the hydrolysis reaction is comparatively slow. In order to insure the preparation of the simple salts from esters of this type, the ester should be hydrolyzed separately before the organic mercury compound is added thereto and then it should be added only in an amount sufficient to react with the quantity of acid which has been formed as the result of hydrolysis.

These several instances are exceptions and the great majority of the esters and all of the other acid derivatives can be reacted immediately with the organic mercury compound to form the corresponding organic mercury derivative.

I have investigated many of these acid derivatives and have prepared a sufficient number of organic mercury derivatives from them to lead me to believe that any number of acid derivatives may be employed in my process. I therefore intend my invention to include all acid derivatives, for example inorganic acid derivatives such as derivatives of the arsenic-containing acid derivatives of organic acids such as carboxylic, sulfonic and acids in which the acidic hydrogen is contained in an OH group. The acid derivatives may correspond to mono- and polybasic acids.

The following examples are given merely as illustrative of the general method which comprises my invention:

*Example 1*

17.64 grams of phenylmercury hydroxide is dissolved in 4 liters of water and heated until solution is complete. The solution is filtered to remove any insoluble material. To the filtrate is added an aqueous solution containing 11.3 grams of neo cinchophen (6-methyl 2-phenyl quinoline 4-carboxylic acid ethyl ester). A precipitate results and the mixture is allowed to stand and cool, after which it is filtered, and the precipitate washed well with warm water and dried. It has a melting point of 162–163° C. The compound is phenylmercury 6-methyl 2-phenyl quinoline 4-carboxylate.

*Example 2*

17.64 grams of phenylmercury hydroxide is dissolved in 2 liters of water and heated until solution is complete. The solution is filtered to remove any insoluble material. To the filtrate is added 7.80 grams of aceto acetic acid ethyl ester (ethyl aceto acetate). A precipitate forms immediately and the reaction may be speeded to completion by the addition of heat. The mixture is allowed to stand and cool, after which the precipitate is filtered, washed well with warm water and dried. It melts at 197–205° C. with decomposition. The compound is phenylmercury aceto acetate.

*Example 3*

8.82 grams of phenylmercury hydroxide is dissolved in 4 liters of water and heated until solution is complete. The solution is filtered to remove any insoluble material. To the filtrate is added 30.96 grams of 90% methyl acrylate dissolved in 50% methyl alcohol. The mixture is heated for about an hour to speed the reaction and the mixture is concentrated to one-half its volume. Upon standing crystals separate which may be removed by filtration, washed well with warm water and a few cc. of alcohol and dried. The material is a white solid and has a melting point of 118–120° C. The compound is phenylmercury acrylate.

Example 4

35.28 grams of phenylmercury hydroxide is dissolved in 2 liters of water and heated until solution is complete. The solution is filtered to remove any insoluble or foreign material. To the filtrate is added 10.56 grams of ethyl malonate. A voluminous precipitate results, indicating that the reaction takes place immediately. The mixture is filtered and the precipitate washed well with warm water and alcohol and dried. The compound has a melting point of 220.5° C., and is phenylmercury malonate.

Example 5

17.64 grams of phenylmercury hydroxide is dissolved in 4 liters of water and heated until solution is complete. The solution is filtered to remove any foreign or undissolved material. To the filtrate is added 12.6 grams of salol (phenyl salicylate) dissolved in 200 cc. of alcohol. A turbidity results but the material immediately redissolves to yield a clear solution. The mixture is allowed to stand and on cooling crystals separate which are removed by filtration, washed well with warm water and dried. The compound melts at 160.5° C. and is phenylmercury salicylate.

Example 6

17.64 grams of phenylmercury hydroxide is dissolved in 4 liters of water and heated until solution is complete. The solution is filtered to remove any gum or undissolved material. To the filtrate is added an aqueous solution containing 4.87 grams of phthalic anhydride. A precipitate results and the mixture is set aside and allowed to cool, after which it is filtered. The precipitate is washed well with distilled water and dried. It has a melting point of 217° C. The compound is phenylmercury phthalate.

By following a similar procedure and employing 6.53 grams of naphthalic anhydride the phenylmercury naphthalate may be prepared. It has a melting point of 181–184° C.

Example 7

35.28 grams of phenylmercury hydroxide is dissolved in one liter of water and heated until solution is complete. The solution is filtered to remove any gum or undissolved material. To the filtrate is added 10.56 grams of d-saccharic mono-lactone dissolved in 200 cc. of water. A precipitate results and the mixture is set aside and allowed to cool after which it is filtered. The precipitate is filtered, washed well with distilled water and dried. It softens at 215° C. and no further change is observed up to 280° C. The compound is phenylmercury saccharate.

Example 8

17.64 grams of phenylmercury hydroxide is dissolved in one liter of water and heated until solution is complete. The solution is filtered to remove any insoluble material. To the filtrate is added 9.72 grams of methyl cinnamate dissolved in 50 cc. of alcohol. The solution is refluxed and filtered while hot. It is allowed to cool and a crystalline precipitate separates. This is removed by filtration, washed with hot water, recrystallized from alcohol and dried. The material has a melting point of 174–175° C. and is the compound phenylmercury cinnamate.

Example 9

17 grams of ethyl ortho-formate is refluxed in the presence of 88.2 grams of phenylmercury hydroxide dissolved in one liter of alcohol containing 10% water. The solution is filtered while hot and allowed to cool. White crystals separate which are removed by filtration, washed and dried. The material sinters at 116–117° C. and does not melt up to 278° C. It is the compound tri-phenylmercury ortho-formate.

Example 10

64.3 grams of phenylmercury hydroxide is dissolved in 1,500 cc. of water and heated until solution is complete. The solution is filtered to remove any insoluble material. To the filtrate is added 100 grams of coconut oil and 1,000 cc. of ethyl alcohol. The mixture is heated and an oily liquid forms on the bottom. At the conclusion of the heating the water-alcohol solution is decanted from the oil at the bottom. The solution is filtered while hot and allowed to crystallize. The material consists of the phenylmercury salts of the acids in coconut oil.

A mixture of hydrogenated coconut oil and cotton-seed oil may be similarly treated. In the resulting material it is possible to observe several types of crystals as, for example, one type of crystals which is very white, brittle and glossy in appearance and probably phenylmercury palmitate, and another type which is much softer and have a yellow translucency in appearance, probably phenylmercury linoleate.

From the above examples it will be readily apparent to one skilled in the art how other water-reactive acid derivatives may be similarly treated to form the corresponding aromatic mercury derivatives.

Various modifications in details of the procedure may be employed without departing from the scope of the invention, which is not to be deemed as limited except as indicated in the appended claims.

I claim:

1. The method of preparing aromatic mercury salts, which comprises reacting a non-ionizable organic compound, capable of forming an acid upon hydrolysis, with an aromatic mercury compound selected from the group consisting of the soluble aromatic mercury hydroxides and the soluble aromatic mercury salts of soluble acids, in which mercury is directly attached by one of its valences to the negative group in the compound and attached by its other valence to a nuclear carbon of an aromatic structure in which none of the carbon atoms has direct linkage with any element other than hydrogen, carbon and mercury, in the presence of water, whereby the aromatic mercury radical becomes attached to an acid radical to form the corresponding aromatic mercury salt.

2. The method of preparing aromatic mercury salts wherein an aromatic mercury group is linked to an acidic radical, which comprises reacting an ester with an aromatic mercury compound selected from the group consisting of the soluble aromatic mercury hydroxides and the soluble aromatic mercury salts of soluble acids, in which mercury is directly attached by one of its valences to the negative group in the compound and attached by its other valence to a nuclear carbon of an aromatic structure in which none of the carbon atoms has direct linkage with any element other than hydrogen, carbon and mercury, in the presence of water, whereby the aromatic mercury radical combines with the acid radical of the ester to form the corresponding salt.

3. The method of preparing aromatic mercury salts wherein an aromatic mercury group is linked to an acidic radical, which comprises reacting an ester of an organic acid with an aromatic mercury compound selected from the group consisting of the soluble aromatic mercury hydroxides and the soluble aromatic mercury salts of soluble acids, in which mercury is directly attached by one of its valences to the negative group in the compound and attached by its other valence to a nuclear carbon of an aromatic structure in which none of the carbon atoms has direct linkage with any element other than hydrogen, carbon and mercury, in the presence of water, whereby the aromatic mercury radical combines with the acid radical of the ester to form the corresponding salt.

4. The method of preparing aromatic mercury salts wherein an aromatic mercury group is linked to an acidic radical, which comprises reacting an acid anhydride with an aromatic mercury compound selected from the group consisting of the soluble aromatic mercury hydroxides and the soluble aromatic mercury salts of soluble acids, in which mercury is directly attached by one of its valences to the negative group in the compound and attached by its other valence to a nuclear carbon of an aromatic structure in which none of the carbon atoms has direct linkage with any element other than hydrogen, carbon and mercury, in the presence of water, to form a salt of the acid corresponding to the anhydride.

5. The method of preparing aromatic mercury salts, which comprises reacting a non-ionizable organic compound, capable of forming an acid upon hydrolysis, with an aromatic mercury hydroxide of the class wherein mercury is directly connected to a nuclear carbon of an aromatic structure in which none of the carbon atoms has direct linkage with any element other than hydrogen, carbon and mercury, in the presence of water, whereby the aromatic mercury radical becomes attached to an acid radical to form the corresponding aromatic mercury salt.

6. The method of preparing aromatic mercury salts wherein an aromatic mercury group is linked to an acidic radical, which comprises reacting an ester with an aromatic mercury hydroxide of the class wherein mercury is directly connected to a nuclear carbon of an aromatic structure in which none of the carbon atoms has direct linkage with any element other than hydrogen, carbon and mercury, in the presence of water, whereby the aromatic mercury radical combines with the acid radical of the ester to form the corresponding salt.

7. The method of preparing aromatic mercury salts wherein an aromatic mercury group is linked to an acidic radical, which comprises reacting an ester of an organic acid with an aromatic mercury hydroxide of the class wherein mercury is directly connected to a nuclear carbon of an aromatic structure in which none of the carbon atoms has direct linkage with any element other than hydrogen, carbon and mercury in the presence of water, whereby the aromatic mercury radical combines with the acid radical of the ester to form the corresponding salt.

8. The method of preparing aromatic mercury salts wherein an aromatic mercury group is linked to an acidic radical, which comprises reacting an acid anhydride with an aromatic mercury hydroxide of the class wherein mercury is directly connected to a nuclear carbon of an aromatic structure in which one of the carbon atoms has direct linkage with any element other than hydrogen, carbon and mercury, in the presence of water, whereby the aromatic mercury radical becomes attached to the acid radical to form the corresponding salt.

9. The method of preparing phenylmercury salts which comprises reacting a non-ionizable organic compound, capable of forming an acid upon hydrolysis, with a phenylmercury compound selected from the group consisting of phenylmercury hydroxide and the phenylmercury soluble salts of soluble acids, in the presence of water, to form the corresponding phenylmercury salt.

10. The method of preparing phenylmercury salts which comprises reacting an ester with a phenylmercury compound selected from the group consisting of phenylmercury hydroxide and the phenylmercury soluble salts of soluble acids, in the presence of water to form the corresponding phenylmercury salt.

11. The method of preparing phenylmercury salts which comprises reacting a non-ionizable organic compound, capable of forming an acid upon hydrolysis, with phenylmercury hydroxide, in the presence of water, to form the corresponding phenylmercury salt.

12. The method of preparing phenylmercury salts in which a phenylmercury group is linked to an acidic radical which comprises reacting an ester with phenylmercury hydroxide in the presence of water, whereby the phenylmercury radical combines with the acid radical of the ester to form a corresponding phenylmercury salt.

13. The method of preparing phenylmercury salts in which a phenylmercury group is linked to an acidic radical, which comprises reacting an organic ester with phenylmercury hydroxide, in the presence of water, whereby the phenylmercury radical combines with the acid radical of the ester to form a corresponding phenylmercury salt.

14. The method of preparing phenylmercury salts in which a phenylmercury group is linked to an acidic radical, which comprises reacting an acid anhydride with phenylmercury hydroxide in the presence of water, to form a phenylmercury salt of the acid corresponding to the anhydride.

15. The method of preparing phenylmercury malonate which comprises reacting ethyl malonate with phenylmercury hydroxide in the presence of water.

16. The method of preparing phenylmercury phthalate which comprises reacting phthalic anhydride with phenylmercury hydroxide in the presence of water.

17. The method of preparing phenylmercury salts, which comprises reacting an acid anhydride with a phenylmercury compound selected from the group consisting of phenylmercury hydroxide and phenylmercury soluble salts, in the presence of water, to form the corresponding phenylmercury salt.

CARL N. ANDERSEN.